Dec. 29, 1959   R. A. RIVERS   2,919,419
TUNABLE CAVITY RESONATOR
Filed March 18, 1955   4 Sheets-Sheet 1

Inventor
Robert A. Rivers
by Roberts, Cushman & Grover
Attys

Dec. 29, 1959     R. A. RIVERS     2,919,419
TUNABLE CAVITY RESONATOR
Filed March 18, 1955     4 Sheets-Sheet 2

Inventor
Robert A. Rivers
by Roberts, Cushman & Grover
Att'ys

Dec. 29, 1959      R. A. RIVERS      2,919,419
TUNABLE CAVITY RESONATOR

Filed March 18, 1955      4 Sheets-Sheet 4

Inventor
Robert A. Rivers
by Roberts, Cushman & Grover
Attys

2,919,419
Patented Dec. 29, 1959

2,919,419

TUNABLE CAVITY RESONATOR

Robert A. Rivers, Nahant, Mass.

Application March 18, 1955, Serial No. 495,314

6 Claims. (Cl. 333—83)

This invention relates to tunable cavity resonators, and more particularly to frequency meters, filters, modulation monitors and similar devices incorporating such resonators, for operation in the microwave range of electromagnetic radiation.

Some of the objects of the present invention are to provide a direct reading frequency meter which is very versatile for laboratory and production as well as for field testing purposes, covering with certainty the frequency range of about 500 to 3,000 megacycles, to provide such a device which is of considerable accuracy due to an extended scale, to provide for such an instrument an extended scale the full range of which can be observed conveniently and with a minimum of motion, to provide such a device which practically excludes spurious responses within its predetermined range, to provide such a device which inherently resonates essentially only in a desired mode of operation, to provide such an instrument which is so small and light that it can be easily carried in one hand and tuned with the other hand and which is very rugged so that it is particularly suited for such use, to provide such a device which can be conveniently used with conventional input and output connectors and detector devices, and to provide such a device which is selfcontained, including if desired in one unit the tunable cavity, a detector device with a suitable resonance indicating meter, a device for directly reading the frequency to which the cavity is tuned, and provisions for adjusting the sensitivity of the meter.

Other objects of the present invention are to provide a device of this type which lends itself to diverse applications without significant change of structure, such as a directly reading frequency meter, as a band pass filter of substantially constant absolute band width, as an oscillator or amplifier load tunable over a wide range, as a filter means for locating the center frequency, in conjunction with a suitable oscilloscope as a modulation monitor capable of showing the D.-C. level of a signal in either amplitude or pulse modulation, in conjunction with an oscilloscope to check the operating frequency and pulse shape of electromagnetic radiation, as a slope detector for monitoring a frequency modulated transmission channel when no amplitude modulation is present, and as a resonant element that can be tuned over the frequency range from zero frequency to the natural resonant frequency of a wave guide section used therewith.

For purposes such as those indicated above, various types of tunable resonators have been proposed, mainly of the coaxial, single ridge, and reentrant cavity type, but these have various basic disadvantages, inherent in their construction, with regard to their tuning range, that is the ratio of highest to lowest frequency to which such a device is tunable without spurious response.

Coaxial resonators for use in their principal modes have tuning ranges that are less than three to one for a quarter wave resonator and two to one for a half wave resonator. If tuned over a greater range than this permitted or unequivocal tuning range, coaxial resonators have resonances for the same frequency at two different settings, or for two frequencies at the same setting. In the quarter wave coaxial resonator, resonances occur at three and five times the frequency to which the resonator is tuned, and resonance may also occur at frequencies equal to slightly more than twice the frequency to which the resonator is tuned and such resonances will be coupled in the same manner as oscillations in the principal mode. With half wave coaxial resonators, resonances occur at frequencies spaced by factors of two so that if the lowest frequency resonance occurs for example at 1000 megacycles, another resonance will be produced at the same setting by a 2000 megacycle signal. Thus the tuning range of this coaxial resonator must be restricted to less than two to one in order to prevent the occurrence of spurious indications.

Single ridge resonators, upon adjustment, change the cutoff frequency along only one dimension, and the other dimension determines the limiting resonant frequency to which the resonator can be tuned. This limiting resonant frequency is thus related to the dimensions of the cavity along the fixed length of the ridge. Consequently, the single ridge resonator can never be tuned to zero frequency. The limiting resonant frequencies of higher order resonances are determined by the same dimensions. As a result, single ridge resonators can be used over frequency ranges of only three to one or less.

The reentrant cavity resonator, due to its cylindrical symmetry, makes impossible the selective coupling, with selective rejection of undesired modes, to a desired mode.

A principal component of the present invention is a bi-directional ridge resonator which, in contradistinction to the above discussed resonators which approach it more closely than others, has properties that inherently avoid with certainty the drawbacks of, and has characteristics that are otherwise superior to those of these known devices.

Bi-directional ridge resonators according to the invention, as distinct from coaxial resonators, have a theoretically infinite tuning range from the frequency of the undistorted $TE_{101}$ mode of oscillation for the resonator without the ridge protruding into the cavity, to zero frequency. While practical tolerances may limit the lowest frequency of this device to near zero frequency instead of the theoretical zero, tuning ranges of three to one, or ten to one are readily obtained without spurious responses. While one other resonance might be possible if excited, the symmetry of the device and the method of coupling can be used to eliminate this possibility and to select only the desired mode of operation.

As compared to single ridge resonators, the bi-directional ridge resonator according to the invention has again the advantage of an infinitely wide tuning range, free from the above discussed spurious responses of single ridge resonators which can never be tuned to near zero frequency.

As compared to the reentrant cavity resonator which can not be selectively coupled to a desired mode, with rejection of undesired modes, the peculiar field orientation in bi-directional ridge type resonators permits the use of coupling methods that definitely select only one desired mode. Bi-directional ridge resonators having unequal axes permit greater tuning ranges than possible with cylindrically symmetric reentrant cavity resonators.

A brief summary of the invention indicating its nature and substance, for attaining the above objects, is as follows.

A tunable cavity resonator according to the invention comprises cavity means having pairs of opposite walls transverse of two axes and a pair of walls transverse of a third axis, one of the third axis walls having a window which is wholly surrounded by this third axis wall, and ridge means freely extending in the direction of the first two axes through the window into the cavity means and being electrically joined to the cavity walls at the edge of the window region. The ridge is on all sides surrounded by and parallel to the window wall, and its bottom is full or uninterrupted, in topological terms essentially simply connected so as to contain essentially all shortest lines that can be drawn within its domain. This bi-directional, full bottom ridge means according to the invention is combined with means for feeding electrical energy into the cavity means and, if desired, with output means, the feeding means being spatially correlated with the cavity means in such a manner that a selected mode of oscillation, preferably the $TE_{101}$ mode, is inherently obtained. The depth of penetration of the ridge means can be adjusted to vary the resonant frequency and scale means can be combined with the adjusting means for indicating or setting a resonant frequency. Suitable detecting and meter means can be combined with the above characterized device in order to indicate resonance while preserving a selected mode, such as the $TE_{101}$ mode.

In a preferred embodiment the cavity as well as the ridge are parallelepipedal; the energy input means are then located in a wall transverse of one of the three axes of the parallelepipedon, the output means in a wall transverse of a second axis, and the detecting means in a wall transverse to the third axis which is also the axis of adjustment of the ridge means; the input means is preferably a loop that bisects the parallelepipedal cavity in order to assure the $TE_{101}$ mode of oscillation.

In another important aspect, a tunable resonator according to the invention comprises a cavity having in one of its walls an opening wholly surrounded by that wall, an energy delivering device coupled with the cavity such as to excite the $TE_{101}$ mode of oscillation, a ridge body mounted for extension through the opening into the cavity, a rotatory control device for adjusting the extension of the ridge body through the opening into the cavity, a drum coupled to the control device for rotation proportionate to the extension of the ridge body into the cavity, and having helical scale means that provide an extended scale in a comparatively small space.

These and other objects and aspects of novelty will appear from the herein presented outline of the principles of the invention, its mode of operation, and its practical possibilities, together with a description of several typical embodiments illustrating its novel characteristics. These refer to drawings in which Figs. 1 and 2 are top and side elevations respectively of an embodiment of the invention;

In Figs. 1 to 9, the practical construction of a resonant device embodying the present invention is indicated as follows.

Figures 1, 2:
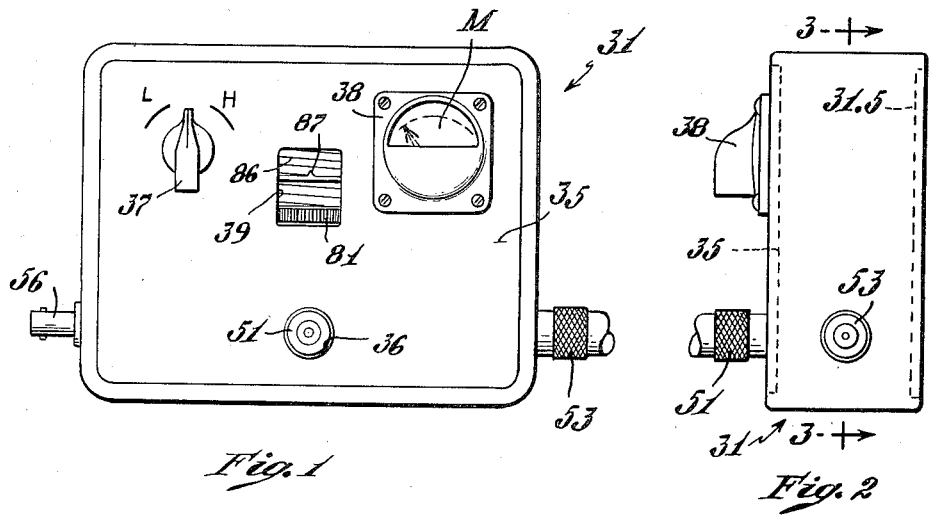
Figure 6:
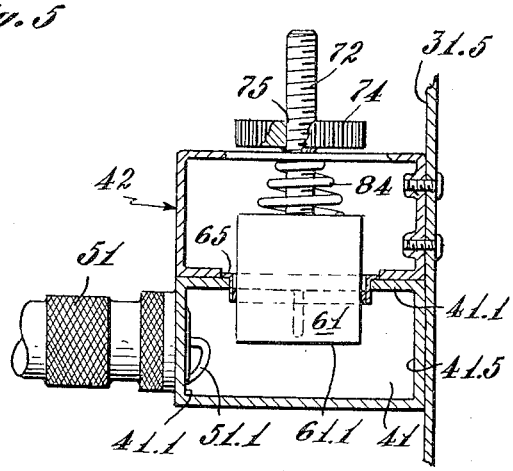
Fig. 6 is a section on lines 6—6 of Fig. 3.

31 is a housing for example made of molded insulating material and has openings 32, 33 (Fig. 3) for the connectors to be described hereinbelow. The housing is closed by a metal panel 35 (Figs. 1 and 2) which has an opening 36 for the input connector, carries a control knob 37 for the instrument resistor to be described below, and supports a face plate 38 for the milliampere meter M. The panel 35 has further a window 39 for the control wheel and the frequency scale likewise to be described hereinbelow. As indicated in Figs. 2 and 4, the molded case has a front wall 31.1, side walls 31.2, 31.3 and a bottom plate 31.5 which carries the cavity box proper, as shown in Fig. 6.

The cavity box 41 (Figs. 3, 5 and 6) is accurately fabricated from suitable metal such as brass and provided with a suitably conducting surface coating by means of silver plating. To the top or ridge wall 41.1 is fastened such as by screws, a bracket 42 which is itself screwed to the bottom panel 31.5 of the casing, as shown in Fig. 6.

Figure 5:
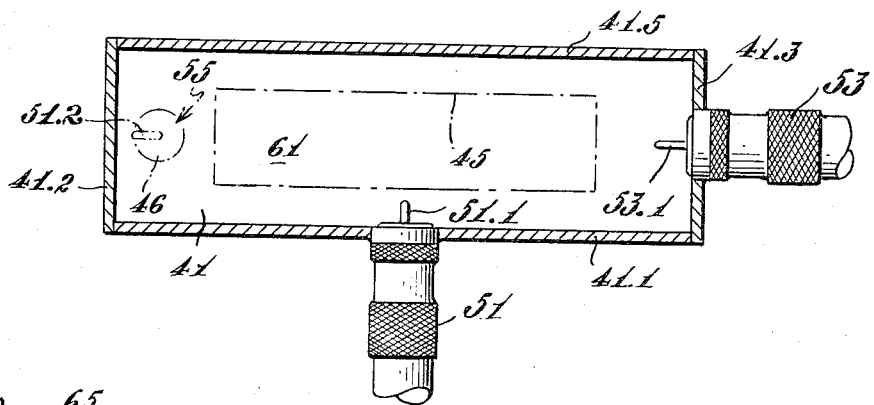
Fig. 5 is a section on lines 5—5 of Fig. 3.

The ridge wall 41.1 of the cavity box 41 has a window 45 the outlines of which are indicated in Fig. 5. The side wall 41.3 carries a conventional coaxial connector 53. Radio frequency connectors of the so-called N-type are used throughout in this embodiment but it will be understood that any suitable type of connectors can be employed. The front wall 41.1 carries in similar manner a connector 51. Loops 53.1 and 51.1 are carried by the connectors, oriented in the manner to be described below with reference to Figs. 10 and 11.

Figure 3:
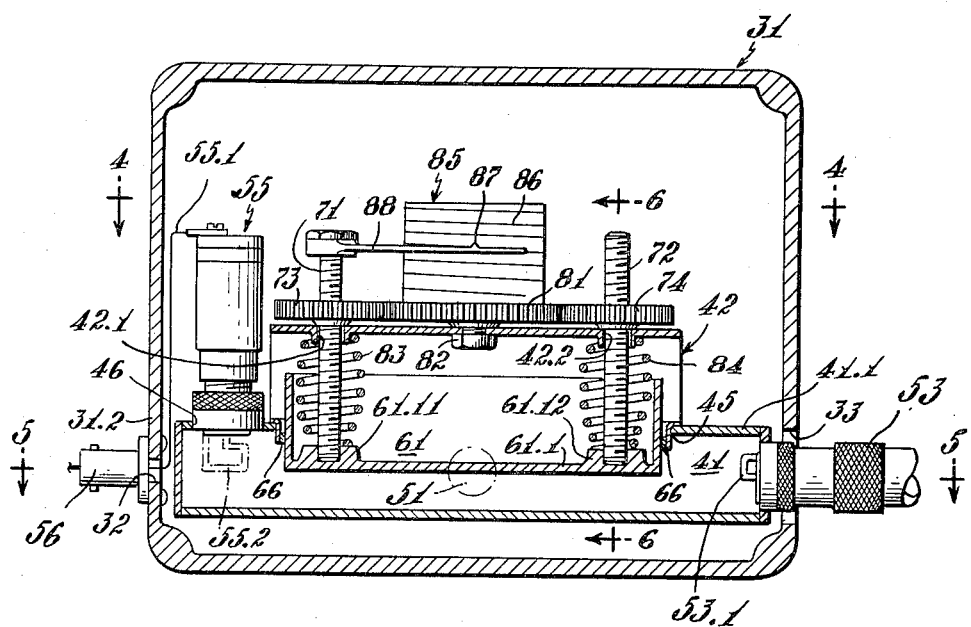
Fig. 3 is a section on lines 3—3 of Fig. 2.
Figure 4:
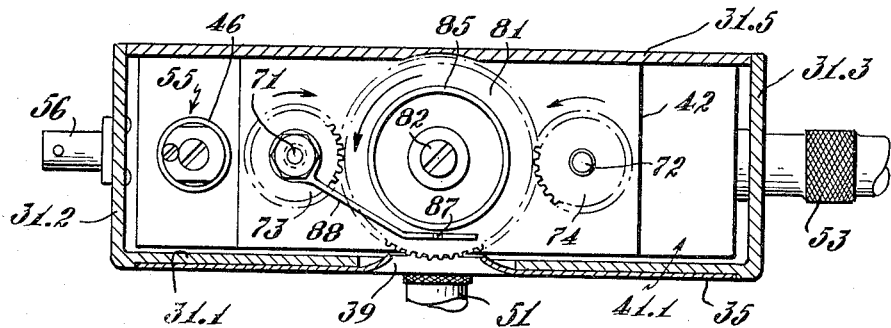
Fig. 4 is a section on lines 4—4 of Fig. 3.

The ridge wall 41.1 also has an opening 46 (Figs. 3, 4, 5) for a detector 55 of conventional construction whose loop 55.2 extends into the cavity as indicated in Fig. 3.

Figure 7:
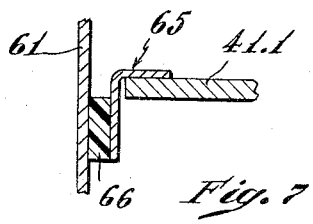
Figs. 7 and 8 are cross sections through juncture devices provided between the cavity box proper and the ridge box, Fig. 7 depicting low impedance device, and Fig. 8 depicting a zero impedance device.
Figure 8:
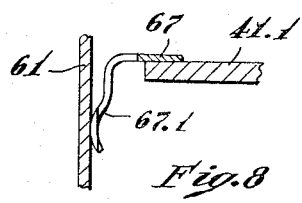
Figure 9:
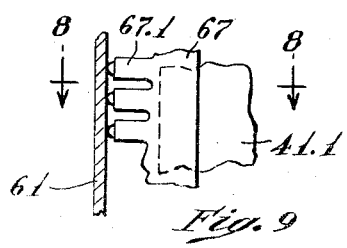
Fig. 9 is a top elevation corresponding to Fig. 8.

The tuning ridge 61 has a cavity wall 61.1 with two threaded bosses 61.11 and 61.12, and four side walls which are high enough to permit essentially complete extension of the ridge into the cavity 41. Between the edges of the window 45 of the cavity box 41 and the side walls of the ridge 61 are mounted strips providing continuously constant electrical correlation between the cavity proper and the ridge body. Fig. 7 indicates a strip 65 of yielding metal, fastened to cavity wall 41.1, which presses an insulation strip 66, providing a low impedance, against the side wall of the ridge body 61. Figs. 8 and 9 show a zero impedance edge connection of conventional design, with flexible metal teeth 67.1 extending from a strip 67 that is mounted on the wall 41.1, and pressing against the ridge walls.

The mechanism for adjustably extending the ridge body into the cavity is shown in Figs. 3, 4 and 6, as follows. Two threaded spindles 71 and 72 are screwed into bosses 61.11 and 61.12, and fixed thereto for example by soldering. Gear wheels 73, 74 are engaged by spindles 71 and 72 respectively, the links of these gear wheels having inside threads matching the spindle threads, as indicated at 75 of Fig. 6. A third, larger, gear wheel 81 is rotatably mounted on the bracket 42 such as by means of a pivot screw indicated at 82 of Figs. 3 and 4. This large gear wheel engages both gear wheels 73 and 74. Springs 83 and 84 (Figs. 3 and 6) tend to move the ridge body towards the inside of the cavity.

A scale drum 85 (Figs. 3 and 4) is mounted on gear wheel 81. This drum carries a helical scale 86 playing on an indicator with pointer 87, carried on an arm 88 which is fixed to the ridge box 61 tor example by means of spindle 71, as shown in Figs. 3 and 4.

The geared rim of wheel 81 protrudes through the window 39 of the panel 35, as indicated in Figs. 1 and 4. It serves as a knob for adjusting the extension of the ridge within the cavity. The spindles 71 and 72, which are rigidly connected to the ridge box wall 61.1 can move up and down with respect to the drum 85 on the bracket 42, through its openings 42.1, 42.2 (Fig. 3). It will now be evident that rotation of gear wheel 81 rotates wheels 73 and 74 in the same direction, opposite to that of the rotation of wheel 81. Depending on the sense of rotation, the spindles 71, 72 move the ridge out of the cavity against the pressure of springs 83 and 84, or permit these springs to move the ridge into the cavity. The rotating scale 86 on drum 85 is correlated with the gears and screws in such a manner that a complete excursion of the ridge corresponds to the calibrated length of the helical scale line. The arm 88 and the point 87 move with the ridge, with the point always on the scale point that indicates the prevailing ridge penetration in the manner of a micrometer gage. The scale 86 is preferably calibrated in terms of frequency.

Figs. 3 and 4 indicate the mounting of the above mentioned crystal detector 55 on the top plate 41.1 of the cavity box; Fig. 3 also shows the lead 55.2 from the detector to the connector 56 which is mounted on the side wall 31.2 of the casing 31. A detector loop 55.2 is likewise indicated.

Figures 10, 11:
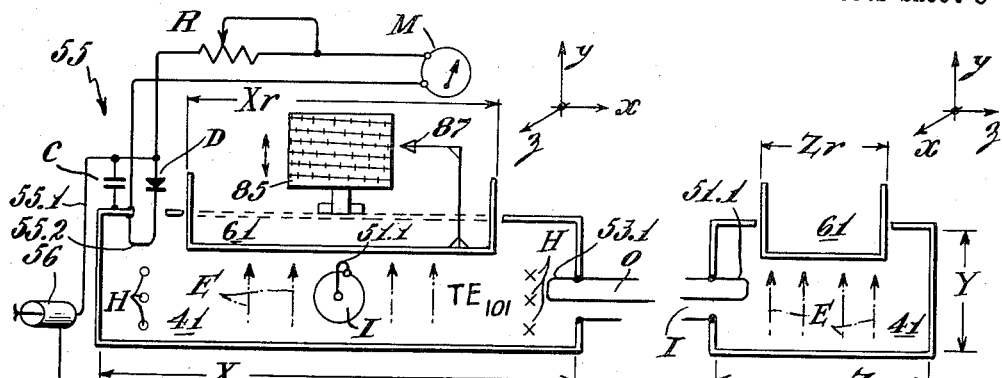
Figs. 10 and 11 are schematic sections indicating, in two planes through a ridge adjustment axis, the components of a device according to the preceding figures.

Figs. 10 and 11 show the complete electric circuit of a tuned resonator according to the present invention. These figures indicate, in conformity with Figs. 1 to 6, input means I corresponding to the loop 51.1, and output means O, corresponding to loop 53.1. The detector 55 feeds through 55.1 into the connector 56. The meter M is connected, through the adjustable resistor R (controlled by the knob 37 of Fig. 1) to the detector 50, which latter consists essentially of a capacitor C and a rectifying element D. These figures further indicate the indicator drum 85 and the pointer 87, the drum rotating in proportion with the penetration of the ridge into the cavity, and the pointer moving up and down with the ridge. Figs. 10 and 11 also indicate the field configuration which, with the input and output loops arranged as shown in these figures corresponds to the $TE_{101}$ mode of oscillation. The dot and dash arrows indicate the E field and the feather and point marks indicate the H field. The input loop I is mounted, symmetrical to the cavity, in a plane parallel to axes $y, z$. The output loop is mounted, symmetrical to the cavity, in a plane parallel to the $x, y$ axes. The detector loop 55.2 is in a plane parallel to axes $x, y$. These axes are indicated at Figs. 10 and 11.

Figs. 10 and 11 also indicate, in capital letter indicia, the critical dimensions of a successful practical embodiment of this device. This embodiment covers the frequency range from 1000 to 3000 megacycles but can be used down to 500 megacycles with somewhat reduced accuracy. Referring to the capital letter indicia of Figs. 10 and 11, these dimensions are as follows.

Figures 12, 13:
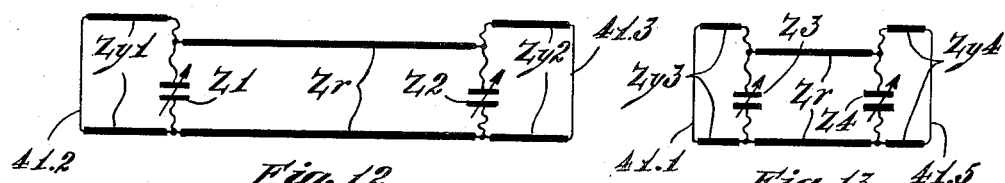
Figs. 12 and 13 are equivalent circuit diagrams corresponding to Figs. 10 and 11 respectively.

$X = 6.000$ inches
$Y = 1.000$ inches
$Z = 2.000$ inches
$Xr = 4.000$ inches
$Zr = 1.000$ inches Figs. 12 and 13 indicate the equivalent circuit as follows. $Zy1, Zy2, Zy3$, and $Zy4$ are the constant impedances of the fixed portions of the cavity box surrounding the window for the ridge 61. $Zr$ is the variable impedance of the ridge portion and the opposite wall of the cavity box. $Z1, Z2, Z3$ and $Z4$ are the varying impedances of the junction regions at the edge of the window. The connections defined by the wall portions of the cavity are indicated at 41.1, 41.2, 41.3 and 41.5 which numerals correspond to those which designate the respective structure, as shown in Figs. 1 to 6.

With reference to Figs. 10 to 13, the above discussed advantages of the construction according to the present invention can now be further explained as follows.

The symmetry of the coupling means with regard to the cavity axes, together with the relation of the Y dimension, with respect to the wavelength at the maximum frequency, effectively exclude any but the $TE_{101}$ mode of oscillation, apart from the tuning provisions.

The bi-dimensional tuning ridge, properly proportioned and symmetrical to the input wave, can in no way affect the theoretically correct and unadulterated field configuration, regardless of the depth of penetration of the ridge. The frequency of the operation is predictable by computing the effect of a given penetration along each dimension in which E field variation exists. The ratios of these dimensions of cavity and ridge, in the $x$ and $z$ axes, respectively, can thus be chosen separately in order to obtain in these axes predetermined cut-off frequencies of principal and higher orders. This ridge penetration determines the amount of lowering of the cut-off frequency in dimension of interest. The wavelength corresponding to the lowered cut-off frequency is then used to compute the actual resonant frequency of the guide. Higher order modes of operation are similarly computed from knowledge of the effect of the ridge on these higher modes along either or both of the dimensions in which they may occur. Coupling to the $TE_{102}$ or $TE_{201}$ modes is eliminated by selection of the point of coupling and orientation of the coupling means, as above described. Scaling of the dimensions of the cavity will result in a cavity resonator, the resonant frequency of which is inversely related to the scaling of the dimensions. Halving all dimensions results in doubling the resonator frequency. The cavity can thus be used in any frequency range where the size is justified.

The operation of devices according to the invention will now be explained with reference to Figs. 14 to 17 which illustrate various possibilities of practical use of such devices.

Figures 14, 15:
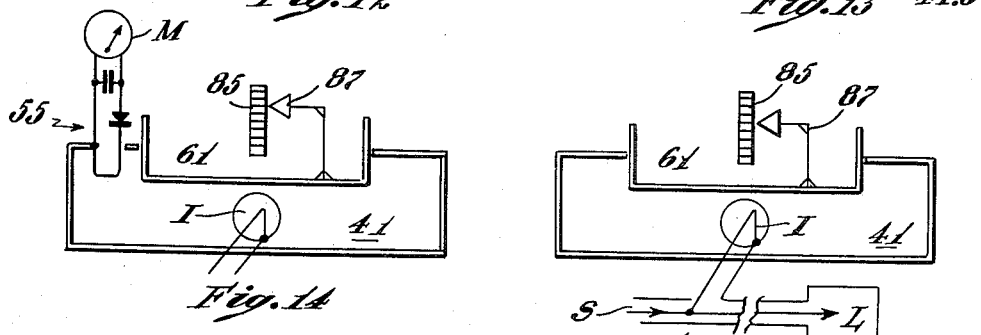
Fig. 14 is a diagram similar to Fig. 10, of a device according to the invention used as a frequency meter.
Fig. 15 is a diagram similar to Fig. 14, showing the insertion of the device into a line leading to an indicating device.

Figs. 14 and 15 indicate the use of a bi-directional ridge resonator as a frequency meter. In an arrangement according to Fig. 14, the signal is supplied at I and the ridge is moved by means of control wheel 81 until the meter M indicates maximum current corresponding to resonance. The resonant frequency can then be directly read by means of the drum scale 86 and the pointer 87. The device according to the invention can be used as an absorption frequency meter, as indicated in Fig. 15. A signal is supplied at S and transmitted to a load L, for example by way of a coaxial conductor 100 to which the input means I of the resonator is connected. The load can be an indicator, a signal receiver, a power meter or any similar device. The cavity is then tuned for minimum indication of the load, indicated at L for example by a voltmeter, ammeter or bolometer, and the corresponding frequency is read on the drum.

Figure 16:
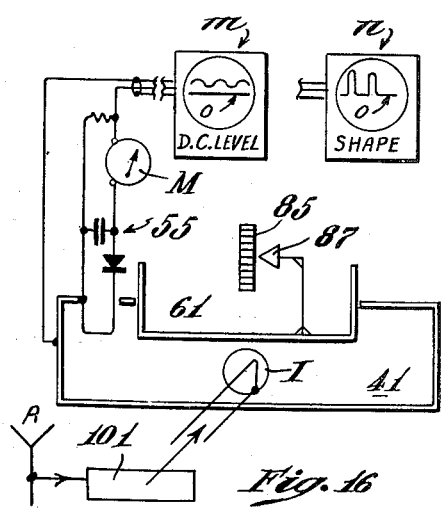
Fig. 16 is a diagram similar to Fig. 14 indicating the use of the device as a monitor.

Fig. 16 indicates the use as a modulation monitor. A signal, for example received from antenna A and transmitted through receiving circuit 101 is supplied to the input means I of the resonator. The detector 55 is fed, in the manner indicated in Figs. 3, 10 and 16, to a suitable oscilloscope with the resonator tuned to the transmission frequency, the D.-C. level of the signal in terms of amplitude or pulse modulation can be detected as indicated at $m$, or the repetition frequency and pulse shape of a radar transmission wave can be checked as indicated at $n$ of Fig. 16. The device can also be used as a slope detector to monitor a frequency modulated transmission when no amplitude modulation is present.

Figure 17:
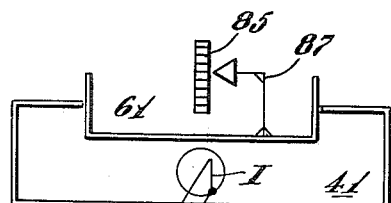
Fig. 17 is a diagram, similar to Fig. 14, indicating the use of the device as a filter.

As indicated in Fig. 17, the device according to the invention can be used as a band pass filter of substantially constant absolute bandwidth. The signal is fed to either side of the cavity as indicated at I, and the output is derived at either end wall of the cavity as indicated at O. By means of the drum and pointer, the ridge is set to the frequency that is to be passed. The present device is particularly suited for this use, because of the above mentioned substantially constant absolute bandwidth which occurs because the Q is proportional to the frequency. This feature is important for a cavity resonator used as an oscillator or amplifier load and tuned over a wide range. In determining optimum tuning as a filter, the meter indication can be used to locate the center frequency.

Figure 18:
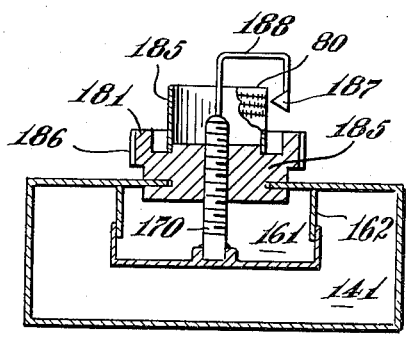
Fig. 18 is a schematical cross section corresponding to Fig. 3, showing a modification of the device according to that figure.

Fig. 18 shows a modification of the ridge controlling and adjustment indicating mechanism shown in Figs. 1 to 6. Instead of penetrating through a window of the cavity, in a device according to Fig. 18 the ridge 161 telescopes over an internal flange 162 of the cavity 141. A stud or spindle 170 is fixed to the bottom of the ridge and can be moved up and down by means of the internal thread of a disc 185 which has a gear and knurled portion 186 and carries the scale drum 185, whose pointer 187 is fastened to the spindle 170. Instead of using a single disc 181, two discs, geared together by way of teeth 186 and with proper right and left-hand threads for the spindles can be used instead, to assure more uniform operation. By turning the disc 181, the penetration and hence the resonant frequency corresponding to a given meter reading can be determined with the aid of a scale and a pointer similar to the above described components 86 and 87.

Figure 19:
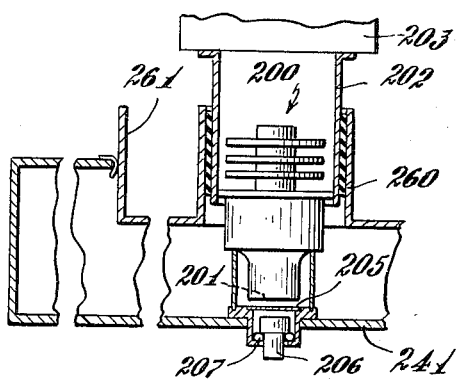
Fig. 19 is a similar cross section illustrating the use of devices according to the invention with a lighthouse type triode.

The present construction lends itself well to the incorporation of triodes, as indicated in Fig. 19. A lighthouse tube 200 of conventional design is inserted in a well 260 of the ridge 261 which is otherwise similar to those shown in Figs. 1 to 18. The anode disc 201 of the tube is connected to a sleeve 202 by means of a suitable sliding contact, such as shown in Figs. 8 and 9 or an insulating sleeve as indicated in Fig. 19. The sleeve 202 is fastened to a fixed support 203. The grid structure 205 is conductively connected to the cavity wall 241, and the cathode structure 206, separated from 241 by an insulator 207, is supplied through an opening in the wall.

Figure 20:
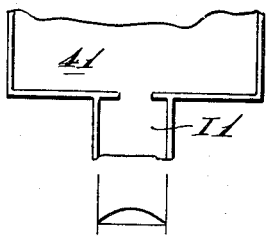
Figs. 20 to 22 are diagrammatical presentations of devices for feeding from wave guides.
Figure 21:
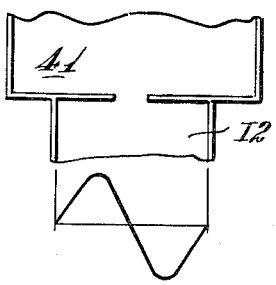
Figure 22:
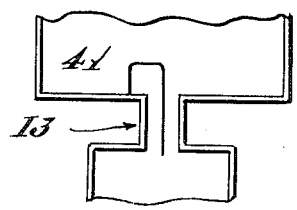

For use with frequencies where coupling to wave guides is desired, the device according to the invention is provided with input structures such as illustrated in Figs. 20 to 22. Figs. 20 and 21 show wave guide connections I1 and I2 for symmetrical and unsymmetrical fields respectively, whereas Fig. 22 shows the coupling of a wave guide by means of a coaxial section I3.

Figure 23:
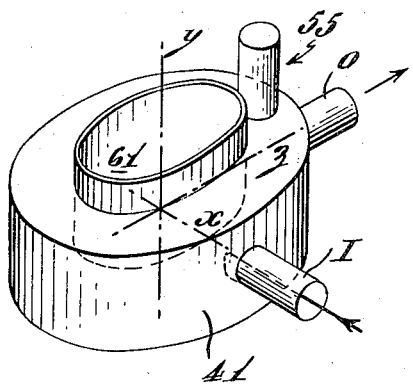
Fig. 23 is a diagram indicating the general structure and mode of operation of devices according to the present invention.

Fig. 23 illustrates the general concept of the present invention, characterized by an elongate cavity 41 symmetrical with respect to axes $x$ and $z$, having in a wall 41.1 which intersects axis $y$, a window wholly surrounded by that wall, an input means I symmetrical to the cavity in the direction of axis $x$ or $z$, with a loop 51.1 or an analogous device arranged in a plane parallel to $x$, $y$, an output means O in the direction of axis $z$ or $x$ and a detecting device 55.

It should be understood that the present disclosure is for the purpose of illustration only and that this invention includes all modifications and equivalents which fall within the scope of the appended claims.

I claim:

1. A wave resonator device comprising conductive cavity means having a first pair of opposite wall portions transverse of a first cavity axis, having a second pair of opposite wall portions transverse of a second cavity axis, having a wall transverse of a third axis intersecting said axes, and having in said transverse wall a window wholly surrounded by the transverse wall; conductive ridge means freely extending through said window into said cavity means, having walls transverse of said first and second cavity axes, and having a full bottom substantially parallel to said transverse wall, said bottom being substantially simply connected so as to contain all shortest lines that can be drawn within its domain; the dimensions of the cavity means and ridge means being unequal in the directions of said first and second axes, respectively, and the ratios of said dimensions being such that they select separately in said first and second axes a predetermined cut-off frequency of principal and higher order modes of oscillation; and means for feeding electrical energy into said cavity means; whereby the amount of extension of the ridge means into the cavity means does not essentially affect the mode of oscillation of the cavity means.

2. A wave resonator device comprising conductive cavity means with three axes of dimension having, transverse of two axes, pairs of opposite walls, respectively, having a wall transverse of the third axis, and having a window in said third axis wall wholly surrounded by that wall; conductive ridge means having walls transverse of said two axes extending through said window into said cavity means electrically adjoining the cavity walls at the edge of the window region where the ridge means penetrates into the cavity means, and having a full bottom substantially parallel to said transverse third axis wall, said bottom being substantially simply connected so as to contain all shortest lines that can be drawn within its domain; the dimensions of the cavity means and ridge means being unequal in the directions of said first and second axes, respectively, and the ratios of said dimensions being such that they select separately in said first and second axes a predetermined cut-off frequency of principal and higher order modes of oscillation; means for feeding electrical energy into said cavity means on one of said three axes; and means for adjusting, on said third axis, the depth of penetration of said ridge means into said cavity means; whereby the cavity resonates at a lower frequency than a cavity of similar configuration but having ridge means extending completely between opposite walls, and the range of frequency adjustment is widened due to the unlimited reduction of cut-off frequency along the first as well as second axes.

3. A wave resonator device comprising a parallelepipedal cavity having a window in one of its walls with said wall completely surrounding said window; means for feeding electrical energy into said cavity; and a parallelepipedal conductive ridge body mounted for free extension through said window into said cavity electrically contiguous to said window wall, and having a full bottom substantially parallel to said window wall, said bottom being substantially simply connected so as to contain all shortest lines that can be drawn within its domain; whereby the said cavity resonates at a lower frequency than a cavity of similar configuration but having ridge means extending completely between opposite walls.

4. A wave resonator device comprising a parallelepipedal cavity having a window in one of its walls which window is completely surrounded by portions of said wall; energy feeding means symmetrically coupled with said cavity such as to excite predominantly the $TE_{101}$ mode of resonance while essentially suppressing the $TE_{102}$ mode; a parallelepipedal conductive ridge body mounted for free extension through said window into said cavity with electrical contiguity to the cavity at said window and with its walls substantially parallel to corresponding sides of said cavity, and having a full bottom substantially parallel to said window wall, said bottom being substantially simply connected so as to contain all shortest lines that can be drawn within its domain; and means for adjusting the extension of said ridge body into said cavity while maintaining said contiguity; whereby the adjusting means permit tuning over a frequency band with essentially constant absolute band width.

5. A wave resonator device comprising a parallelepipedal cavity having a window in one of its walls which window is completely surrounded by portions of said wall; energy feeding and receiving means symmetrically coupled with intersecting walls, respectively, of said cavity such as to excite predominantly the $TE_{101}$ mode of resonance while essentially suppressing the $TE_{102}$ mode, and essentially preventing the coupling of the $TE_{201}$ mode to the receiving means; a parallelepipedal conductive ridge body mounted for free extension through said window into said cavity with electrical contiguity to the cavity at said window and with its walls substantially parallel to respective sides of said cavity, and having a full bottom substantially parallel to said window wall, said bottom being substantially simply connected so as to contain all shortest lines that can be drawn within its domain; and means for adjusting the extension of said ridge body into said cavity while maintaining said contiguity; whereby the adjusting means permit tuning over a frequency band with essentially constant absolute band width.

6. A wave resonator device comprising a substantially rectangularly prismatic cavity means having in a wall a window wholly surrounded by the wall, the window edges being substantially parallel to respective outer edges of its wall; conductive substantially rectangularly prismatic ridge means freely extending through said window into said cavity means with electrical contiguity to the cavity means at said window edges, having walls substantially parallel to respective walls of the cavity means, and having a full bottom substantially parallel to said window wall, said bottom being substantially simply connected so as to contain all shortest lines that can be drawn within its domain; energy feeding means coupled with said cavity; and means for adjusting the depth of penetration of said ridge means into said cavity means while maintaining said contiguity; whereby said adjusting means permit tuning over a frequency band with essentially constant absolute band width.

References Cited in the file of this patent
UNITED STATES PATENTS

| | | |
|---|---|---|
| 2,311,520 | Clifford | Feb. 16, 1943 |
| 2,550,409 | Fernsler | Apr. 24, 1951 |
| 2,596,458 | Zaleski | May 13, 1952 |
| 2,697,209 | Sichak | Dec. 14, 1954 |
| 2,788,497 | Osial et al. | Apr. 9, 1957 |

FOREIGN PATENTS

| | | |
|---|---|---|
| 1,067,419 | France | Jan. 27, 1954 |